May 16, 1961  A. I. MIHALAKIS  2,984,152
PROJECTION SCREENS
Original Filed Nov. 23, 1951  2 Sheets-Sheet 1
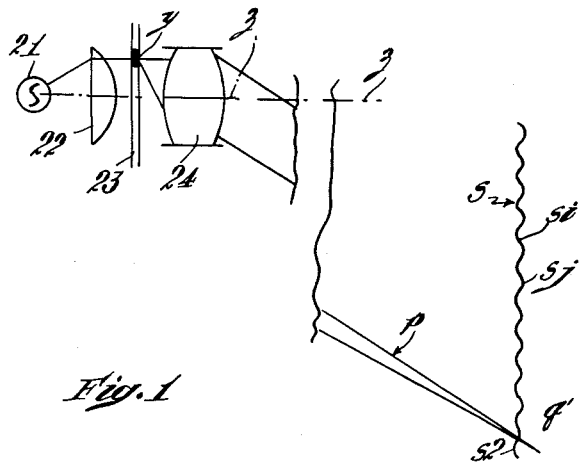
Fig. 1
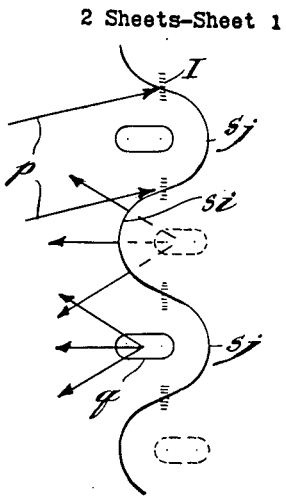
Fig. 3
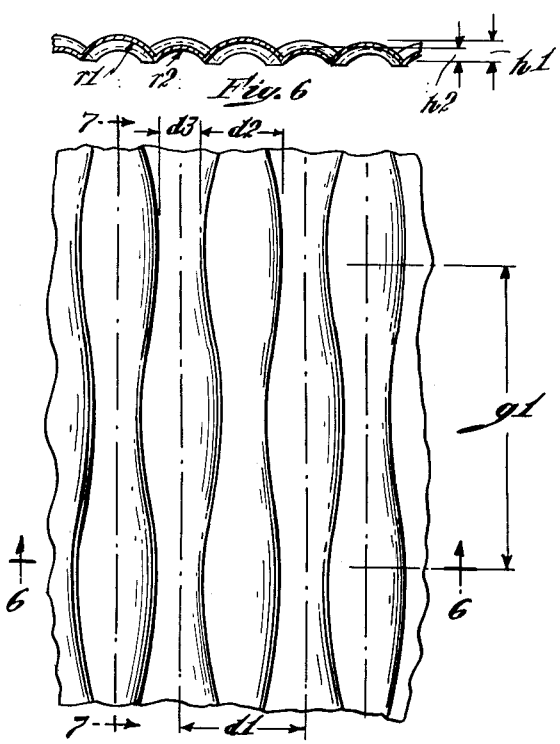
Fig. 6
Fig. 5
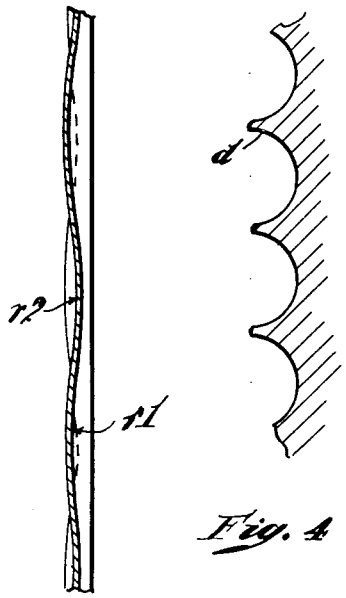
Fig. 4
Fig. 7
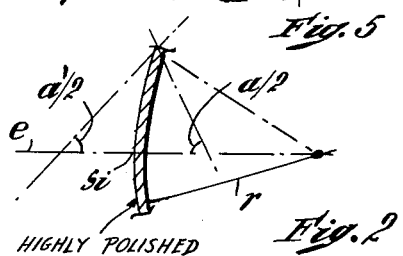
HIGHLY POLISHED  Fig. 2
INVENTOR.
Agis I. Mihalakis
BY Roberts, Cushman & Grover,
ATT'YS.

United States Patent Office 2,984,152
Patented May 16, 1961

2,984,152

PROJECTION SCREENS

Agis I. Mihalakis, Buffalo, N.Y., assignor, by mesne assignments, to William T. Snyder, South Lancaster, Mass.

Original application Nov. 23, 1951, Ser. No. 257,691, now Patent No. 2,804,801, dated Sept. 3, 1957. Divided and this application Aug. 27, 1957, Ser. No. 683,437

14 Claims. (Cl. 88—28.9)

The present invention relates to optical screens of the type suitable to receive an image formed by projection apparatus and to present the image to observers. This application is a division of my application Serial No. 257,691, filed November 23, 1951, now Patent No. 2,804,801 of September 3, 1957.

It is one of the primary objects of the present invention to provide a projection screen which not only provides optimum utilization of the available image energy, but utilization of such image energy, even of comparatively low level, under very unfavorable conditions of extraneous, nondesirable light. It will be understood that such extraneous or ambient light, while increasing the intensity level of the projected image, for perceptional purposes does not sufficiently raise the intensity of the highlight portions of the image, thus decreasing the contrast of, and blotting out the projected image. With a sufficiently high image intensity, screens designed according to the present invention remain operative under extremely unfavorable conditions, such as broad daylight falling upon the screen.

Another object of the invention is to provide a screen of the above type which reflects into a given observation field as defined by the lateral and vertical viewing angles, a substantially constant average image intensity, so that the screen retains uniform brilliance over the entire area, whether it is viewed directly in the optical axis of projector and screen system or from a side within the field of observation.

A further object of the invention is to provide projection systems of simple design, and easy manufacture and operation, which permit satisfactory utilization of illumination levels for which conventional devices have proved to be inoperative or requiring cumbersome and expensive arrangements.

In accordance with one aspect of my invention, a screen for viewing, from within a field of observation, an image projected on the screen from an object region, comprises a plurality of juxtaposed substantially nondiffusing elementary optical systems either all convex or concave or alternatingly convex and concave, and together forming the total screen surface and being curved such as to present elementary images essentially only to the field of observation, and to direct light incident on the screen from without the field of observation to any point of that field essentially only at intensities which are at that point lower than the intensity directed by the screen to such point from the object.

In another aspect, the elementary surfaces have boundaries constituting stops and curvatures determining image areas such that the relative values of the stops and curvatures define elementary object and image field angles which together admit to a field of observation essentially all light from an object while excluding an essential amount of light incident from without the fields of observation. Thus the elementary images effected by the elementary surfaces are presented essentially only to the field of observation while light incident on the screen from without that field is essentially excluded from the field of observation. In accordance with a preferred embodiment of the invention, the elementary optical systems are alternately convex and concave and merge to form a continuously undulated screen surface so that the above-mentioned field angles are at boundary regions where the respective convex and concave curves merge.

A further important feature of the invention is elementary surfaces with double curvature either negative or positive or both, at substantially all points of the screen surface with the exception of the above-mentioned boundary regions.

Another important feature of the invention is the shaping of the elementary optical systems in such a manner that the above-mentioned field angles differ in lateral and vertical directions to conform to a given field of observation with different dimensions in these directions, so that the image light energy available from a given object is directed mainly into that field and a practically minimum amount thereof into space outside thereof, while an essential part of extraneous light, that is light coming from outside the field of observation of such dimensions, is directed into space outside of that field, which has the above-mentioned effect of providing at any point of the field of observation an image intensity which is considerably higher than the intensity that reaches the same point from such extraneous light sources. In this manner the projected image retains under most practical circumstances contrast sufficient for distinct perception regardless of the intensity of extraneous light, whether strong direct or diffuse artificial or daylight. The brillance of screens according to the invention is under most practical conditions high enough to prevent contrast reduction and hence image deterioration other than coming from the projected object.

In a further more specific aspect, the invention contemplates elementary optical elements of certain dimensions, which have proved to be particularly beneficial and which will specifically be described herein with reference to their actual performance.

While certain features of the present invention relate mainly to observation of the image from the side facing the projector or other object, others apply as well to back projection screens which transmit the image light or other useful light from one surface of the screen to the other, with the field of observation on the opposite side from the object. Such features include the configuration of lens elements which replace the mirror elements of opaque or front projection screens, and the spatial correlation of such elements. In certain instances the optical elements according to the invention will reflect as well as refract light incident thereon, with useful results derived from their peculiar configuration and correlation.

Other objects, aspects, and features, in addition to those contained in the above short statement of the nature and substance including some of the objects of the invention, will appear from the herein presented exposition of its basic theoretical principles so far as they can be ascertained at the present time and from the following description of several typical embodiments thereof illustrating its novel characteristics. This description refers to drawings in which Fig. 1 is a diagrammatical median section through a screen according to the invention;

Fig. 2 is a diagram indicating the first-order theory of the field angles and stops of mirrors of the type herein employed;

Fig. 3 is a diagrammatic cross section through several elementary optical elements of a screen according to the invention, illustrating its performance with regard to the formation of elementary images and of the presentation of these images;

Fig. 4 is diagrams illustrating undesirable dead areas;

Figs. 5 to 7 illustrate the actual configuration of a practical embodiment of a screen according to the invention, in plan view and sections on lines 6—6 and 7—7 respectively.

Figure 8:
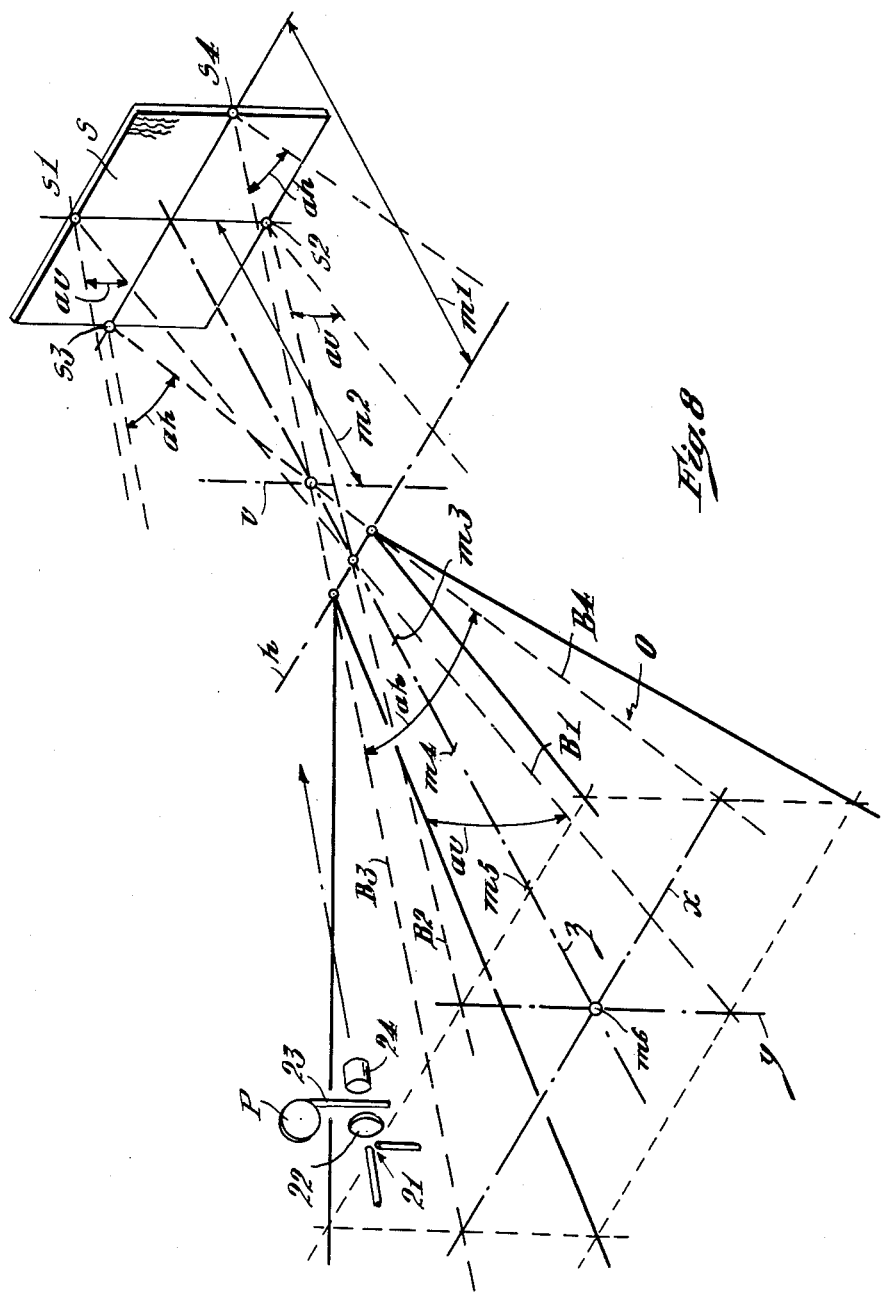
Fig. 8 is a diagrammatical representation of screens according to the invention in environment determining its structure.

Figs. 1 and 2 show a screen S of conventional overall dimensions arranged for projection thereon of an image produced by conventional projection apparatus p comprising a light source 21, a condenser 22, a diapositive such as a film strip 23, and a projector lens system 24. It will be understood that the projector as a whole or the diapositive 23 defines an object region containing this embodiment as an object the diapositive which can be considered to consist of object elements $a$ (Fig. 2) that are by the lens system 24 imaged on corresponding elementary areas $a'$ of screen S which are defined by elementary optical systems $s$, such as the curved mirrors indicated in Figs. 1 and 2.

Fig. 1 shows, in a simplified cross section through part of screen S, by way of example convex and concave elementary mirrors $si$ and $sj$ which together constitute a continuously undulated screen surface. Optically speaking, convex and concave elements are equivalent for purposes of the invention, as will further appear from the following discussion. While alternately convex and concave elements offer important advantages in accordance with one of the aspects of the invention, other features of the invention can be accomplished with only convex or only concave elements otherwise constructed and arranged according to the invention.

The screen S can be made of suitable sheet metal such as brass or steel. Optically less desirable metal screens can be coated, if desirable, with another metal as for example nickel, chromium, aluminum or silver. The screen body can be made with essentially equidistant front and rear surfaces, or it can be solid with a flat rear surface. The screen can also be made of dielectric material such as polymerized plastic compounds shaped in accordance with the invention and coated with a metal layer applied to the reflecting layer. A protective layer of suitable optical properties can be applied over such coating. Such a protective layer is sometimes also desirable in the case of solid metal screens. In every case, the optically effective surface must be polished or otherwise smoothed to the highest possible degree commensurate with the material and purpose at hand, in order to render it non-scattering.

Fig. 2 shows a single screen mirror element, in this instance a convex element $si$. The optical properties of the elements are for present purposes sufficiently described and determined by the axis $e$, ordinarily but not necessarily parallel to system axis $z$, radius $r$, object field angle $a/2$, and image field angle $a'/2$. As well known, these values determine, together with a given object and observer the stops and entrance and exit pupils and windows respectively; these again determine the field covered by the optical element in terms of $a/2$, and the emerging rays in terms of $a'/2$. For purposes of the invention as embodied in the examples given hereinbelow, the angle $a'$ is quite large and its definite value immaterial, so that only angle $a$ is indicated.

Since the dimensions of the mirror elements can be freely selected within the psychophysiological limitations to be referred to below, the mirror element configuration as a whole can be fitted to the given field or fields of observation. Thus, an optimum amount of light energy available can be directed and spread into the field of observation, so to speak from the object (in this case the diapositive), and concentrated therein with minimum loss and therefore optimum brilliance of the elementary image as perceived by the observer within the field of observation. Furthermore, any light from a source outside the field of observation is deviated into space outside that field, so that it cannot interfere with the projected image. If this outside light is coming from outside of and undesirable in the field of observation, such as direct or indirect artificial or daylight, the contrast of the object such as a diapositive will be preserved and indeed improved as compared to that obtainable with conventional screens which do not reject such extraneous light and therefore often obliterate the image by lowering the contrast to physiologically undesirable degree. If the outside light is operatively desirable such as that of a second projector, the two (or if desired more) fields of observation can be kept apart. This latter embodiment of the invention will be described more in detail hereinbelow.

For purposes of the present example with considerable distance between screen and projector, it can be assumed that the mirror axes are parallel; it will be understood however that, for more nearly equal object and image distances from the imaging system, the mirror configuration can be determined for inclined mirror axes and non-parallel incident pencils, in accordance with well known principles.

Possible differences in average image distance of convex and concave elements respectively, are of second order importance especially in view of the fact that the images extend axially, so that they are for practical purposes within a plane formed by the mirror boundaries.

The elementary images are subject to considerable aberration but the mirror elements are designed to furnish images which are as concentrated as possible. This does not necessarily mean that they must be small in all dimensions, but they are designed in accordance with the principles of reflecting surfaces to furnish optimum brilliance. This brilliance is considerably higher than that of extraneous light which might be reflected into the field of observation by unavoidable irregular or uncontrollable regions of the reflecting screen. This brilliance is further higher than that of light which usually might originate in the field of observation.

The distorted real or virtual elementary images can be considered to constitute light sources which are as to intensity and color modulated by the corresponding object element. The mirror profiles need not be perfect so long as they are highly polished and have the above-mentioned field properties; aberration is favorable for averging the detail of the object element. I observed that small but high intensity images fuse as well as larger less intense images at similar separations.

The peculiar choice of elementary image configuration and spacing is based, in accordance with the invention, on the concept not to attempt matching or registering of the border regions of comparatively undistorted elementary images, but to provide small image points which are highly concentrated transversely of the respective mirror element even so as to act as comparatively intense sources of light modulated as to wave length and amplitude by the object, such as a transparency in a projector. It is thus not the regularity of the elementary images which controls essentially continuous and well defined presentation of the entire image, but the effective separation and brilliance relation of the elementary point images. Such fusion is governed by different psychophysiological principles than those applying to the matching of adjacent low intensity patterns. It was found that in accordance with this principle, the elementary systems can be larger than it was heretofore supposed to be feasible, with the ensuing mechanical advantages including those of ease of manufacture, possibility of higher polish, and possibility of better control of shape. Since according to this concept the pattern of each individual image point is irrelevant and therefore aberration and distortion is beneficial rather than detrimental, the optical elements can be shaped and surfaced purely with a view to providing a maximum energy output into the field of observation, by judicious choice of surface properties and object and image field angles together with field stop defining boundaries or rims.

The above characteristic features are illustrated in Fig. 3 which shows several elementary mirrors $s$, with transversely concentrated real and virtual images $q'$ extending axially, a ray pencil $p$, and a plane $I$ through the boundary regions of the elementary mirrors.

It will now be evident that comparatively little detrimental light is reflected into a chosen field of observation so that, as initially stated, a screen composed of mirror elements according to the invention reflects such detrimental light into the field of observation essentially only at intensities which are at any one point of that field lower than the intensity of the image.

The optimum mirror element configuration for a given purpose can be easily arrived in accordance with the principles of the invention at either theoretically as indicated above, or empirically. The following practical embodiments have given the satisfactory performance indicated in connection therewith.

The screen shown in Figs. 5 to 7 has the following dimensions indicated in these figures.

$r1 = 0.055''$ $r2 = 0.030''$ $d1 = 0.120''$ $d2 = 0.077''$ $d3 = 0.043''$ $h1 = 0.015''$ $h2 = 0.010''$ $g1 = 0.275''$

A screen constructed according to Figs. 5 to 7, 22" wide and 19" high, placed at a distance of 14 feet from a standard 35 mm., 500 watt projector, with the projector approximately normal to the screen, is determined by a field of observation having the following approximate dimensions indicated in Fig. 8.

$m1 = 11$ feet $m2 = 15$ inches

Angle $ah = 107.20$

Angle $av = 8.20$

It will be understood that the front edge distance of the field of observation is approximate and that the practically useable field begins at a greater distance from the screen. Needless to say the field extends in the rear theoretically into infinity and is practically limited in that direction by architectural or other considerations.

With as many as ten flood lights with reflectors of 500 watts each, shining directly on the screen, placed in a solid bank at 3 feet horizontal distance from the screen and 3 feet vertical distance from the projector axis, with the screen according to Figs. 5 to 7 receiving an image from the above projector, an image of excellent contrast was obtained on the screen according to Figs. 5 to 7, whereas the image on a conventional beaded screen was extinguished by excess illumination received from the floodlights. The following comparative values in foot candles indicate the respective performances, these values having been measured in the projector axis at distances $m3$, etc.

*Projector and extraneous sources effective*

| Distance | | | | |
|---|---|---|---|---|
| Feet | m3<br>14 | m4<br>15 | m5<br>16 | m6<br>17 |
| FC $\dfrac{\text{Figs. 5-7}}{\text{Beaded}}$ | 0.90 | 0.85 | 0.80 | 0.75 |
| | 4.20 | 3.65 | 3.40 | 3.20 |

Unmodulated light from the projector alone without film was measured at 52 FC at the center of the screen. These values are essentially the same in lateral points at the above distances, close to the borders of the object field as shown in Fig. 8, with abrupt decrease of image contrast beyond these borders.

This test is confirmed by the following readings taken at the same points but with the flood lights extinguished and the projector in operation as before. This test also indicates the improved efficiency of screens according to the invention, apart from the rejection of detrimental extraneous illumination.

*Projector alone effective*

| Distance | | | | |
|---|---|---|---|---|
| Feet | m3<br>14 | m4<br>15 | m5<br>16 | m6<br>17 |
| FC $\dfrac{\text{Figs. 5-7}}{\text{Beaded}}$ | 0.90 | 0.85 | 0.80 | 0.75 |
| | 0.60 | 0.55 | 0.50 | 0.45 |

The beneficial effect of screens according to the invention is still further illustrated by a test during which the screens used for the above tests, were in the same setup and environment, affected by the flood lights only, with the projector turned off. The flood light intensity measured at 500 FC at the center of the screens. Under these conditions, the light reflected from the screen according to the invention was measured 0.5 FC at 1 foot from the screen while the beaded screen measured at 150 FC at the same point.

The above screens are made with substantially non-scattering surfaces of brass, polished to mirror smoothness, and if desired, chromium or nickel plated depending upon requirements of color selectivity. It was found that the highly polished brass surface is satisfactory for many purposes.

Screens of the above type can be manufactured in various ways. Some shapes can be milled by conventional shop methods. Others, such as that according to Figs. 5 to 7, are preferably made as follows. A master model is first made by hand or machine, to a scale large enough to permit fairly exact incorporation of the predetermined curvatures. This model is then reduced to actual scale by copying on a three dimensional engraving machine of conventional design employing the pantograph principle, in material suitable for use of the actual scale copy as a matrix. The screens are then pressed from the matrix according to conventional practice. Such a surface has been engraved into a knurling tool and such surfaces can be knurled into rolls, or engraved into rolls, creating, by conventional methods, a male and female pair through which sheet material can be rolled.

It should be understood that the present disclosure is for the purpose of illustration only and that this invention includes all modifications and equivalents which fall within the scope of the appended claims.

What is claimed is:

1. An optical screen for presenting to a field of observation the image of an object region projected on said screen, comprising an essentially corrugated surface which is substantially everywhere curved in the same sense with respect to said field of observation, each corrugation being modified to provide a curvature undulating from concave to convex in a direction lengthwise of the corrugations in a plane perpendicular to the plane of the screen and to provide a ridged curvature intersecting said plane, the concave and convex undulations having a greater radius of curvature than the radius of curvature of the corrugations, providing a highly directional imaging surface composed of a plurality of elementary optical surfaces each having a curved rim and imaging cross sectional curvatures, said elementary optical surfaces being arranged in rows with undulating contours and being substantially contiguously joined at said rims which joined rims form two intersecting series of aperture lines, one series being continuously curved and lying in a plane that is essentially parallel to a plane tangential to said contours, the second series of aperture lines being recurrently curved to form ridges at the aperture lines of the first series whereby the surface areas within each row are essentially optically wholly controllable so that the highly directional screen presents said image to said field of observation with high intensity.

2. Screen according to claim 1, wherein said elementary optical surfaces are in said plane perpendicular to the plane of the screen alternately convex and concave and merge to form a continuously undulated screen surface within said continuously curved aperture lines.

3. An optical screen for presenting to a field of observation the image of an object region projected on said screen, comprising an essentially corrugated surface which is substantially everywhere curved in the same sense with respect to said field of observation, each corrugation being modified to provide a curvature undulating from concave to convex in a direction lengthwise of the corrugations in a plane perpendicular to the plane of the screen and to provide a ridged curvature intersecting said plane, the concave and convex undulations having a greater radius of curvature than the radius of curvature of the corrugations, providing a highly directional imaging surface composed of a plurality of elementary optical surfaces each having a rim curvature and imaging cross sectional curvatures for conjointly producing elementary stops and image fields of corresponding configurations, said elementary optical surfaces being arranged in rows with contours continuously varying through cross sections wherein they are substantially contiguously joined at said rims to form one series of continuously curved aperture lines with adjacent rows joined at ridges and constituting a second series of ridged aperture lines intersecting said first series at said ridges, whereby each elementary surface presents to its image field an elementary image of optimum intensity, which image fields can be determined by selection of said rim and imaging curvatures to conform to a predetermined field of observation.

4. An optical screen for presenting to a field of observation the image of an object region projected on said screen, comprising an essentially corrugated surface which is substantially everywhere curved in the same sense with respect to said field of observation, each corrugation being modified to provide a curvature undulating from concave to convex in a direction lengthwise of the corrugations in a plane perpendicular to the plane of the screen and to provide a ridged curvature intersecting said plane, the concave and convex undulations having a greater radius of curvature than the radius of curvature of the corrugations, providing a highly directional imaging surface composed of a plurality of elementary optical surfaces each having a rim curvature and imaging cross sectional curvatures for conjointly producing rectangular elementary stops and image fields, said elementary optical surfaces being arranged in staggered rows with alternatingly convex and concave contours continuously varying with points of inflection through one series of cross sections lengthwise of said corrugation and varying similarly but in alternatingly opposite sense through a second series of cross sections lengthwise of said corrugation, within respective pairs of rims with points of inflection, said series of cross sections being parallel to each other and being substantially contiguously joined at said rims, said rims and said points of inflection, respectively, forming two rectangularly intersecting series of curved aperture lines, whereby the surface areas within each row are essentially optically curved in the same sense throughout, and optically wholly controllable, and each elementary surface presents to its image field an elementary image of optimum intensity, which image fields can be made rectangular by selection of said rim and imaging curvatures to conform to a rectangular field of observation.

5. An optical screen for presenting to a field of observation the image of an object region projected on said screen, comprising an essentially corrugated surface which is substantially everywhere curved in the same sense with respect to said field of observation, each corrugation being modified to provide a curvature undulating from concave to convex in a direction lengthwise of the corrugations in a plane perpendicular to the plane of the screen and to provide a ridged curvature intersecting said plane, the concave and convex undulations having a greater radius of curvature than the radius of curvature of the corrugations, providing a highly direction reflective imaging surface composed of a plurality of elementary curved mirrors each having a curved rim and imaging cross sectional curvatures for conjointly producing elementary stops and image fields of corresponding configurations, said elementary mirrors being arranged in rows with undulating contours, and being substantially contiguously joined at said rims which joined rims form two intersecting series of curved aperture lines, one series being continuously curved and lying in a plane that is essentially parallel to a plane tangential to said contours, the second series of aperture lines being recurrently curved to form ridges at the aperture lines of the first series whereby the joining surface areas within each row are essentially optically wholly controllable, and each elementary mirror presents to its image field an elementary image of optimum intensity, which image fields can be determined by selection of said rim and imaging curvatures to conform to a predetermined field of observation.

6. A screen according to claim 5 wherein said elementary mirrors are elongate with an approximately 2.75 to 1.2 ratio of the maximum dimension to the minimum dimension.

7. A screen accordang to claim 6 wherein said maximum dimension is in the order to magnitude of 0.275 inch.

8. Screen according to claim 5 wherein said imaging curvatures have alternate approximate apex radii of 0.03 inch and 0.055 inches respectively.

9. A screen according to claim 5 wherein said rows are staggered with said continuously curved aperture lines forming an essentially linear pattern of minimal length.

10. An optical screen for presenting to a field of observation the image of an object region projected on said screen, comprising an essentially corrugated surface which is substantially everywhere curved in the same sense with respect to said field of observation, each corrugation being modified to provide a curvature undulating from concave to convex in a direction lengthwise of the corrugations in a plane perpendicular to the plane of the screen and to provide a ridged curvature intersecting said plane, the concave and convex undulations having a greater radius of curvature than the radius of curvature of the corrugations, providing a highly directional reflective imaging surface composed of a plurality of elementary curved mirrors each having curved rims and imaging cross sectional curvatures for conjointly producing rectangular elementary stops and image fields of corresponding configurations, said elementary mirrors being arranged in staggered rows with points of inflection between alternatingly convex and concave contours lengthwise of said corrugation located within, and substantially contiguously joined at said rims, said rims and said points of inflection, respectively, forming two intersecting series of curved aperture lines one of which series is continuously curved and lies in a plane that is essentially parallel to a plane tangential to said contours, the second series of aperture lines being recurrently curved to form ridges at the aperture lines of the first series whereby the joining surface areas within each row are essentially optical curved in the same sense throughout, and optically wholly controllable, and each elementary mirror presents to its image field an elementary image of optimum intensity, which image fields can be made rectangular by selection of said rim and imaging curvatures to conform to a rectangular field of observation.

11. An optical screen for presenting to a field of observation the image of an object region projected on said screen, comprising an essentially corrugated surface which is substantially everywhere curved in the same sense with respect to said field of observation, each corrugation being modified to provide a curvature undulating from concave to convex in a direction lengthwise of the corrugations in a plane perpendicular to the plane of the screen and to provide a ridged curvature intersecting said plane, the concave and convex undulations having a greater radius of curvature than the radius of curvature of the corrugations, providing a highly directional reflective imaging surface composed of a plurality of elementary curved mirrors each having circularly curved rims and circular imaging cross sectional curvatures for conjointly producing rectangular elementary stop and image fields of corresponding configurations, said elementary mirrors being arranged in staggered rows with points of inflection between alternatingly convex and concave contours lengthwise of said corrugation, and said elementary mirrors being located within, and substantially contiguously joined at said rims, said rims and said points of inflection, respectively, forming two intersecting series of curved aperture lines one series being continuously curved and lying in a plane that is essentially parallel to a plane tangential to said contours, the second series of aperture lines being recurrently curved to form ridges at the aperture lines of the first series whereby the surface areas within each row are essentially optically curved in the same sense throughout, and optically wholly controllable, and each elementary mirror presents to its image field an elementary image of optimum intensity, which image fields can be determined by selection of said rim and imaging curvatures to conform to a predetermined field of observation.

12. A projection screen for optimum utilization by reflection of light impinging thereon, comprising an essentially corrugated surface, each corrugation being modified to provide a curvature undulating from concave to convex in a direction lengthwise of the corrugations in a plane perpendicular to the plane of the screen and to provide a ridged curvature intersecting said plane, the concave and convex undulations having a greater radius of curvature than the radius of curvature of the corrugations, providing a plurality of optical elements which together constitute a highly directional imaging surface, said optical elements being substantially everywhere curved in the same sense with respect to said impinging light, such that the boundaries between adjacent elements are formed by the points of curvature change from one element to the next and constitute two interesting series of lines, one series being continuously curved and lying in planes which intersect each other in lines that are parallel to the imaging surface as a whole and the other series having reversal points and lying in planes which intersect each other in parallel lines that are parallel to the imaging surface as a whole and oblique to said intersection lines of said first series, whereby said surface is essentially being substantially everywhere curved in the same sense with respect to said impinging light, wholly directional and image forming without flat and scattering areas, and said lines constitute the aperture boundaries of each one of said elements.

13. Screen according to claim 12 wherein each of said optical elements is curved in relation to its boundaries such that the viewing zone in which the projected image becomes visible is of rectangular configuration.

14. Screen according to claim 12 wherein said planes of said first series of lines coincide such as to constitute a single plane that is essentially parallel to the imaging surface as a whole, and said planes of said second series of lines are parallel and intersect said imaging surface as a whole at substantially right angles.

References Cited in the file of this patent
UNITED STATES PATENTS
2,804,801    Mihalakis _____ Sept. 3, 1957